United States Patent
Wu et al.

(10) Patent No.: US 7,005,535 B2
(45) Date of Patent: Feb. 28, 2006

(54) FERROELECTRIC LIQUID CRYSTAL MATERIAL DERIVED FROM LACTIC ACID

(75) Inventors: Shune-Long Wu, Taipei (TW); Cho-Ying Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/799,625

(22) Filed: Mar. 15, 2004

(65) Prior Publication Data
US 2005/0067606 A1  Mar. 31, 2005

(30) Foreign Application Priority Data
Sep. 29, 2003  (TW) .............. 92126800 A (51) Int. Cl.
*C07C 69/78* (2006.01)
*C09K 19/20* (2006.01)

(52) U.S. Cl. ............... 560/64; 560/65; 252/299.65

(58) Field of Classification Search .......... 252/299.64, 252/299.65, 29.66, 299.67; 560/85, 64, 65
See application file for complete search history.

(56) References Cited

FOREIGN PATENT DOCUMENTS

JP  63-307837  * 12/1988

OTHER PUBLICATIONS

CAPLUS 2000: 648640.*
CAPLUS 2003: 198315.*
CAPLUS 2003: 295966.*
English abstract for JP 63-307837, 1988.*

* cited by examiner

Primary Examiner—Shean C. Wu
(74) Attorney, Agent, or Firm—Bacon & Thomas, PLLC (57) ABSTRACT

The present invention relates a chiral compound, comprising a general formula as formula (I):

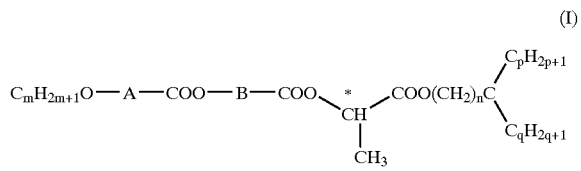

wherein A, B independently are,

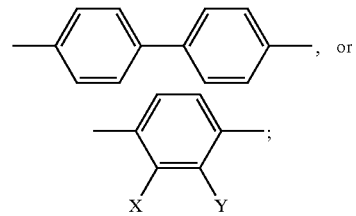

X, Y independently are fluorine, hydrogen or chlorine; m represents an integral from 6 to 18; n represents 0; p represents 0, 3 or 4; and q represents 2, 3 or 4.

2 Claims, 7 Drawing Sheets

FERROELECTRIC LIQUID CRYSTAL MATERIAL DERIVED FROM LACTIC ACID

BACKGROUND OF THE INVENTION

1. Field of the Invention

The present invention relates to a liquid crystal material with optical activity, more particularly, to a liquid crystal material with strong ferroelectricity.

2. Description of Related Art

Ferroelectric liquid crystal is a material with spontaneous polarization properties, and such polarization will be inversed when an electric field is applied. The main features of liquid crystal with strong ferroelectricity include: (1) smectic liquid crystal phase with tilt angles; (2) chiral molecules (without racemic molecule) contained at the end groups of liquid crystal molecules; and (3) dipoles present at the direction perpendicular to the major axis of liquid crystal molecules. Chiral center of the compound will shorten response time. Besides, the polarity of the chiral center, rotational viscosity and electric field strength are crucial factors of the response time of ferroelectric liquid crystal.

The arrangement of molecules in ferroelectric liquid crystal is helix layer. When the molecules of two layers have the same tilt arrangement, the distance between these two layers is identified as "a pitch". On the other hand, if the ferroelectric liquid crystal is subjected between two layers of conductive glasses wherein the distance between which is less than a pitch, the arrangement of the liquid crystal is prohibited to form helix layers. Even if the electric field is removed, the arrangement of liquid crystal before applied with electric field can't be restored anymore. Namely, the arrangement of ferroelectric liquid crystal applied with electric field can be conserved. This is so-called surface stabilized ferroelectric liquid crystal.

Furthermore, it has been proven that achiral materials with swallow-tailed groups have $S_mC_{alt}$ phase at antiferroelectric-like structure.

SUMMARY OF THE INVENTION

It is the object of the present invention to provide a chiral liquid crystal material which has a broad range of operating temperature.

To achieve the object, the present invention provides a series of chiral (L)-lactic acid-based materials with chiral swallow-tailed group. The swallow-tailed group is alkanol. The swallow-tailed material with optic activity of the present invention comprises the following formula (I):

(I)

wherein A, B, independently are

X, Y independently are fluorine (F), hydrogen (H) or chlorine (Cl); m represents an integral from 6 to 18; n represents 0 or 1; p represents 1, 2, 3 or 4; and q represents 1, 2, 3 or 4.

The materials of the present invention are lactic acid derivatives which are commercially available and widely used as chiral groups of lactic acid-based liquid crystal, so it is very economic and convenient to prepare such kind of liquid crystal.

DETAILED DESCRIPTION OF THE PREFERRED EMBODIMENT

For the compound I, II and III prepared from embodiment 1 or 2, the feature of SmA* phase is the formation of focal-conic texture, while the feature of SmC* phase is the formation of broken focal conic texture. All of the compounds of the present invention show enatiotropic SmA* and SmC* phases. Furthermore, compound II (10, 0, 2) shows an extra unidentified SmX* phase. The meso-phase and phase transformation temperature of the target molecule are determined with DSC, and the results are listed in Table 1, 2 and 3.

TABLE 1

Phase transformation temperature of compound I (m, 2, 2; m = 8~12) and relative enthalpy data

| m | Iso | SmA* | SmC* | Cr[b] | m.p.[c] |
|---|---|---|---|---|---|
| 8 | • 126.4 [4.26][d] | • 102.2 [0.25] | • 16.2 [6.42] | • | 76.6 [27.98] |
| 9 | • 120.4 [2.42] | • 103.4 [0.35] | • 13.5 [6.59] | • | 73.5 [22.37] |
| 10 | • 120.4 [3.45] | • 105.9 [0.63] | • 21.4 [13.58] | • | 82.2 [34.76] |
| 11 | • 113.5 [4.74] | • 102.2 [2.23] | • 27.4 [29.27] | • | 79.4 [46.02] |
| 12 | • 111.6 [2.55] | • 100.9 [0.92] | • 31.3 [26.96] | • | 60.43 [43.72] |

Phase Transformation Temperature (° C.)[a]

[a]Rorded by DSC thermograms at cooling rates of 5° C. min$^{-1}$
[b]Cr refers to crystal.
[c]m.p. refers to melting point taken from DSC thermograms recorded at heating rates of 5° C. min$^{-1}$.
[d]Figures in square parenthesis denote enthalpies quoted in Jg$^{-1}$.

TABLE 2

Phase transformation temperature of compound II (10, n, q; n = 0, 3~4, q = 2~4) and relative enthalpy data Phase Transformation Temperature (° C.)[a]

| Compound | Iso | SmA* | SmC* | SmX* | Cr.[b] | mp.[c] |
|---|---|---|---|---|---|---|
| II(10, 0, 2) | • 146.5 [5.59][d] | • 117.8 [0.54] | • 31.6 [4.09] | • 16.83 [19.4] | • | 60.3 [45.81] |
| I(10, 2, 2) | • 120.4 [3.45] | • 105.9 [0.63] | • 21.4 [13.58] | | • | 82.2 [34.76] |
| II(10, 3, 3) | • 101.3 [9.49] | • 85.5 [2.67] | • 21.5 [18.04] | | • | 38.7 [32.04] |
| II(10, 4, 4) | • 89.6 [1.05] | • 69.7 [0.51] | • 20.5 [17.10] | | • | 48.7 [36.95] |

[a]Rorded by DSC thermograms at cooling rates of 5° C. min$^{-1}$
[b]Cr refers to crystal.
[c]m.p. refers to melting point taken from DSC thermograms recorded at heating rates of 5° C. min$^{-1}$.
[d]Figures in square parenthesis denote enthalpies quoted in Jg$^{-1}$.

TABLE 3

Phase transformation temperature of compound III (X, Y) and relative enthalpy data Phase Transformation Temperature (° C.)[a]

| Compound | Iso | SmA* | SmC* | Cr[b] | m.p.[c] |
|---|---|---|---|---|---|
| I (10, 2, 2) | • 120.4 [3.45][d] | • 105.9 [0.63] | • 21.4 [13.58] | • | 82.2 [34.76] |
| III (F, H) | • 95.0 [6.45] | • 74.5 [0.54] | • 20.4 [29.37] | • | 38.8 [35.74] |
| III (Cl, H) | • 73.2 [4.26] | • 45.5 [0.01] | • −1.9 [12.13] | • | 34.7 [20.22] |
| III (H, F) | • 113.1 [6.78] | • 95.6 [0.36] | • 14.3 [19.01] | • | 27.4 [24.94] |
| III (H, Cl) | • 86.1 [3.99] | • 69.6 [0.53] | • 10.8 [4.44] | • | 34.7 [20.22] |

[a]Recorded by DSC thermograms at cooling rates of 5° C. min$^{-1}$
[b]Cr refers to crystal.
[c]m.p. refers to melting point taken from DSC thermograms recorded at heating rates of 5° C. min$^{-1}$.
[d]Figures in square parenthesis denote enthalpies quoted in Jg$^{-1}$.

Figure 1:
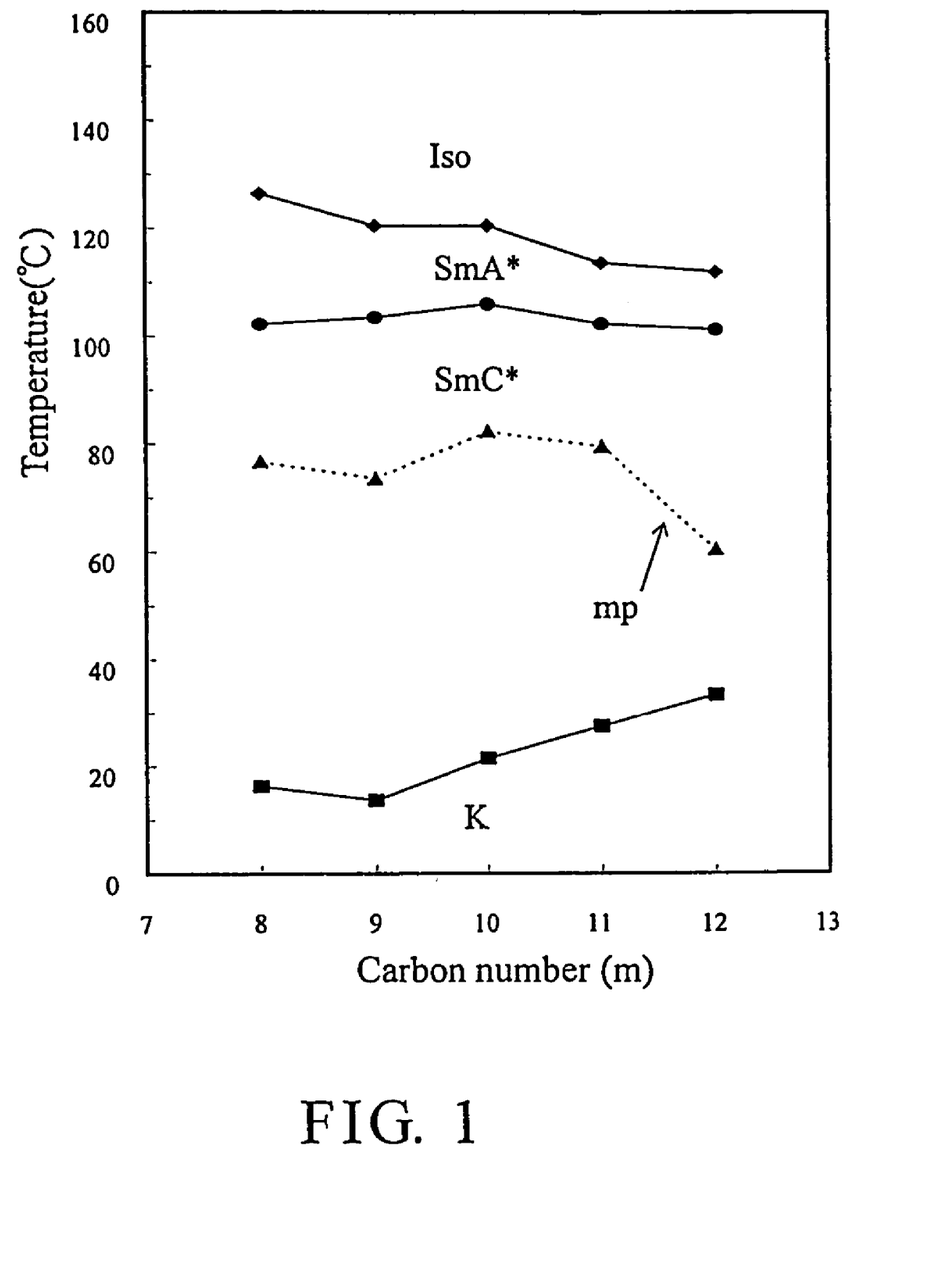
FIG. 1 is a diagram of phase transformation temperature versus end chain length (m) of compound I (m, 2, 2) of the present invention.

FIG. 1 is a diagram of phase transformation-temperature versus end chain length (m) of compound I (m, 2, 2). From the figure we know that such compounds demonstrate ferroelectric SmC* phase with broad temperature range and the clear point is decreased with the increase of chain length. However, the SmC*—Cr transformation temperature is increased with the increase of chain length. This is suggested that the thermostability of Sma* and SmC* is suppressed when m is increased.

Figure 2:
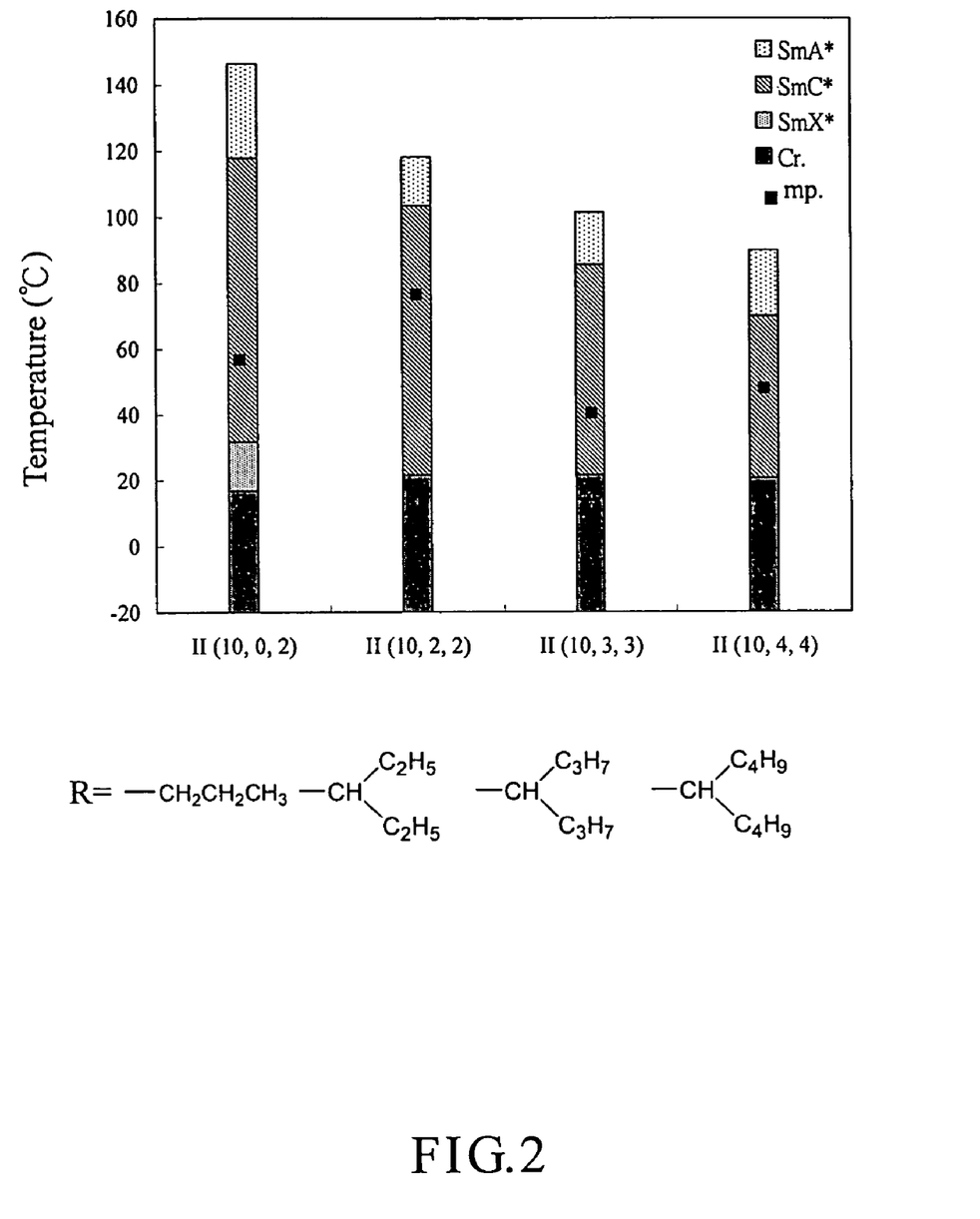
FIG. 2 is a phase transformation diagram of compound II (10, p, q; p=0, 3~4, q=2~4) of the present invention during cooling process wherein the chiral terminal group is coupled with linear group or swallow-tailed group.

FIG. 2 is a phase transformation diagram of compound I (10, 2, 2) and compound II (10, p, q) of the present invention during cooling process, wherein the chiral terminal groups of compound I and II are coupled with linear group or swallow-tailed group. From the figure we know that if the chiral terminus is coupled with linear chain, the thermostability of Sma* and SmC* is excellent. Such character proves that the chain length of the chiral terminus effects the smetic phase formation. It also proves that the clear point and phase transformation temperature of SmA*–SmC* decreases as the chain length of swallow-tailed group increases. Therefore, the extended swallow-tailed group can stabilize SmA* phase but suppresses the formation of SmC*.

Figure 3:
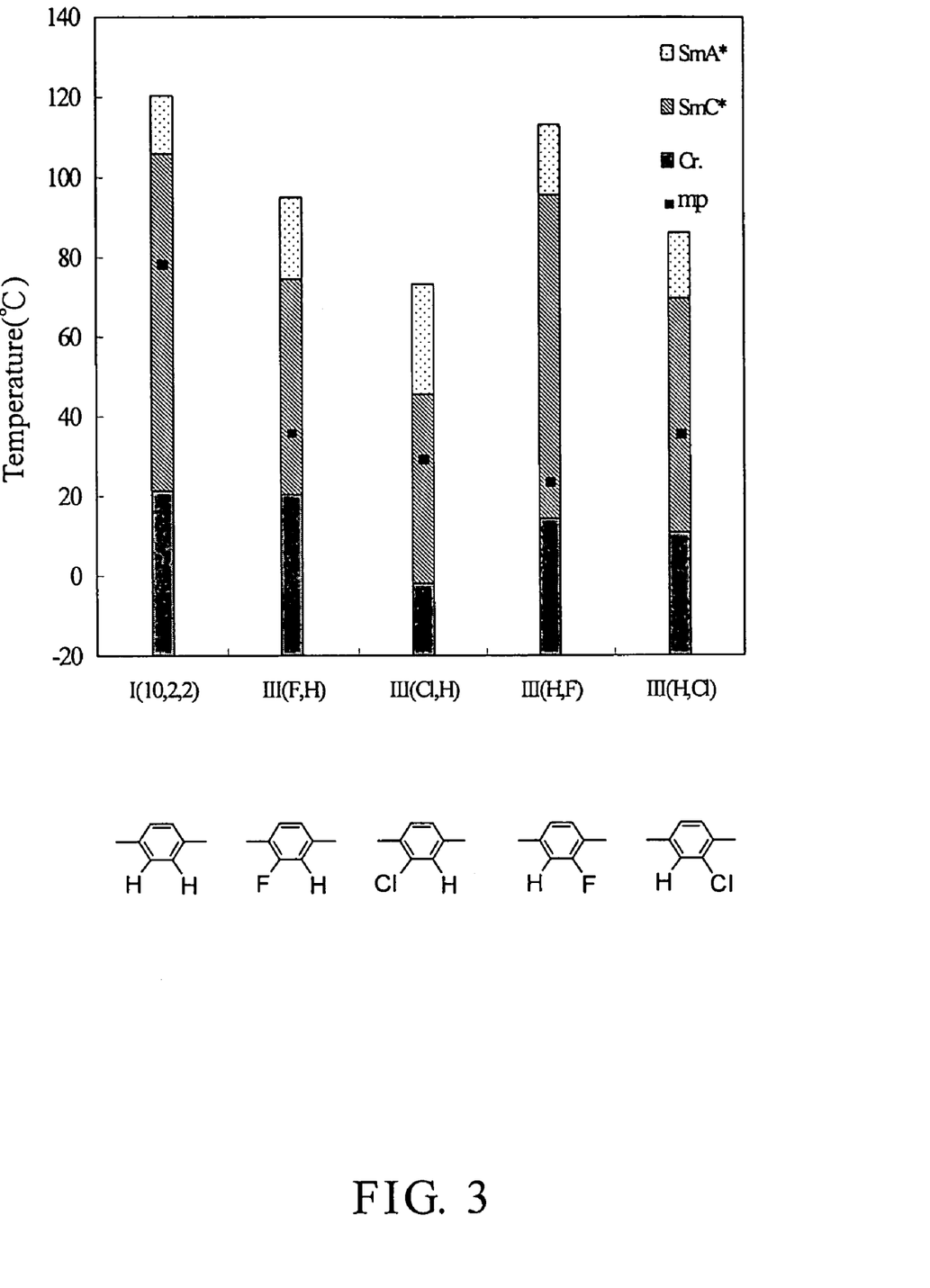
FIG. 3 is phase transformation diagram of compound III (X, Y) of the present invention wherein the halogen group is substituted with side chain.

FIG. 3 is phase transformation diagram of compound III (X, Y) of the present invention wherein the side chain is selectively substituted by halogens. From the figure we can see that if the core part of compound III is substituted by halogen-containing side chain, the mesophase formation is restrained, and the transformation temperature as well as the melting point decreases. Comparing compound III (F, H) with compound III (H, F), 2-fluoro substituted compound has higher transformation temperature. This is suggested that stereo hindrance and least molecule expansion exist in the 2-fluoro substituted compound. Comparing compound III (Cl, H) with non-substituted compound I (10, 2, 2), the transformation temperature of the former one is much lower; therefore, the larger side chain substituted group (ex. Cl) does effect the formation of mesophase.

Figure 4:
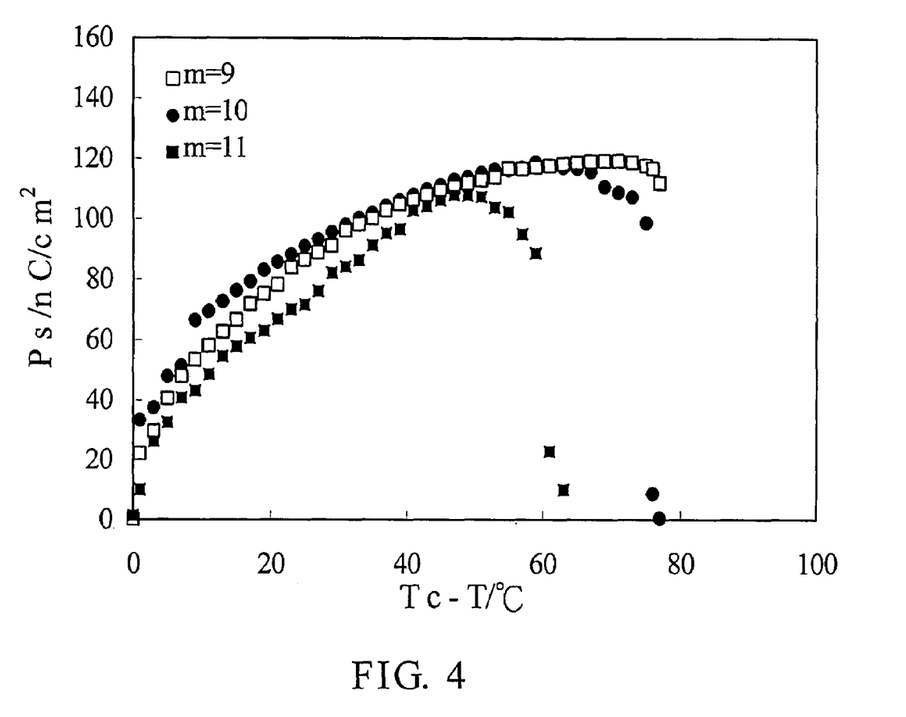
FIG. 4 is the spontaneous polarity ($P_s$) of compound I (m, 2, 2).
Figure 5:
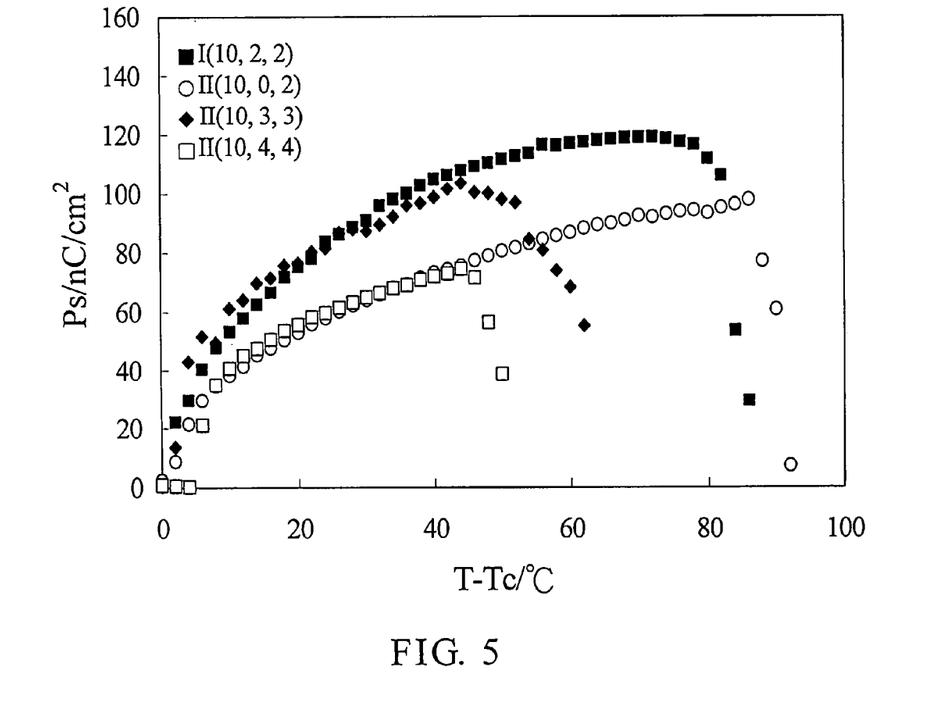
FIG. 5 is the spontaneous polarity ($P_s$) of compound II (10, p, q).
Figure 6:
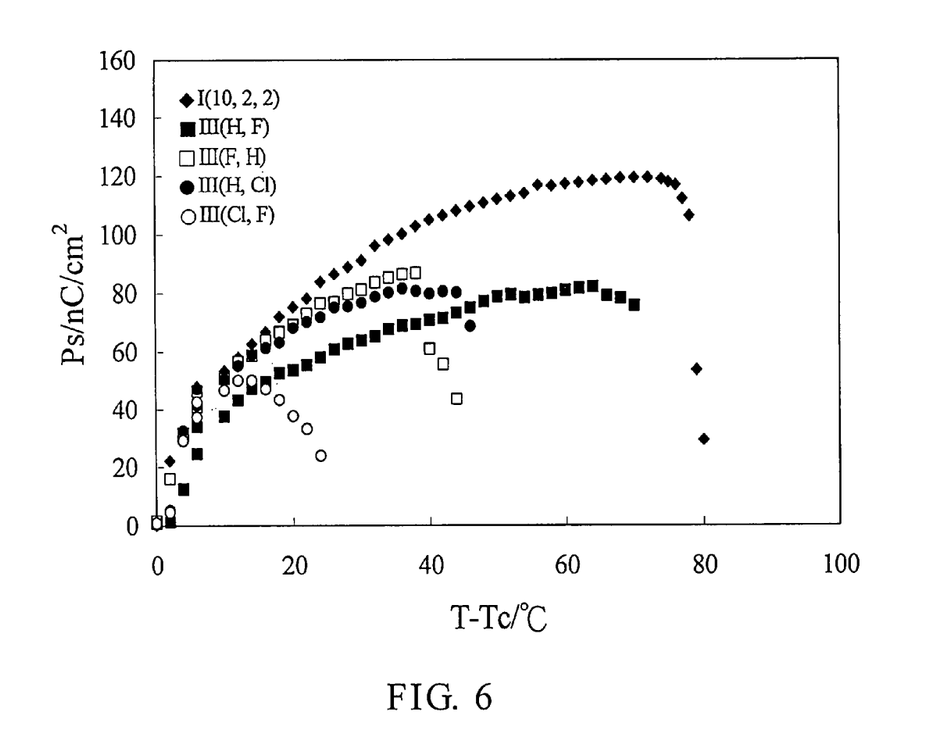
FIG. 6 is the spontaneous polarity ($P_s$) of compound III (X, Y) and unsubstituted compound I (10, 2, 2).

The spontaneous polarity ($P_s$) values of various compounds are shown in FIGS. 4–6. FIG. 4 shows that the highest $P_s$ value of compound I (m, 2, 2) ranges from 107–119 nC·cm$^{-2}$. The $P_s$ value and chain length are not so relevant.

FIG. 5 shows that the highest $P_s$ value of compound II (10, p, q) ranges from 97–119 nC·cm$_{-2}$. Comparing compound II (10, p, q) with compound I (10, 2, 2), the chiral compound with linear chain has less spontaneous polarity. On the other hand, comparing compound I (10, 2, 2) with compound II (10, 3, 3), it is observed that the compounds with longer swallow-tailed group have lower $P_s$ value.

FIG. 6 shows the comparison of compound III (X, Y) and non-substituted compound I (10, 2, 2). Compound I (10, 2, 2) has higher $P_s$ value.

Figure 7:
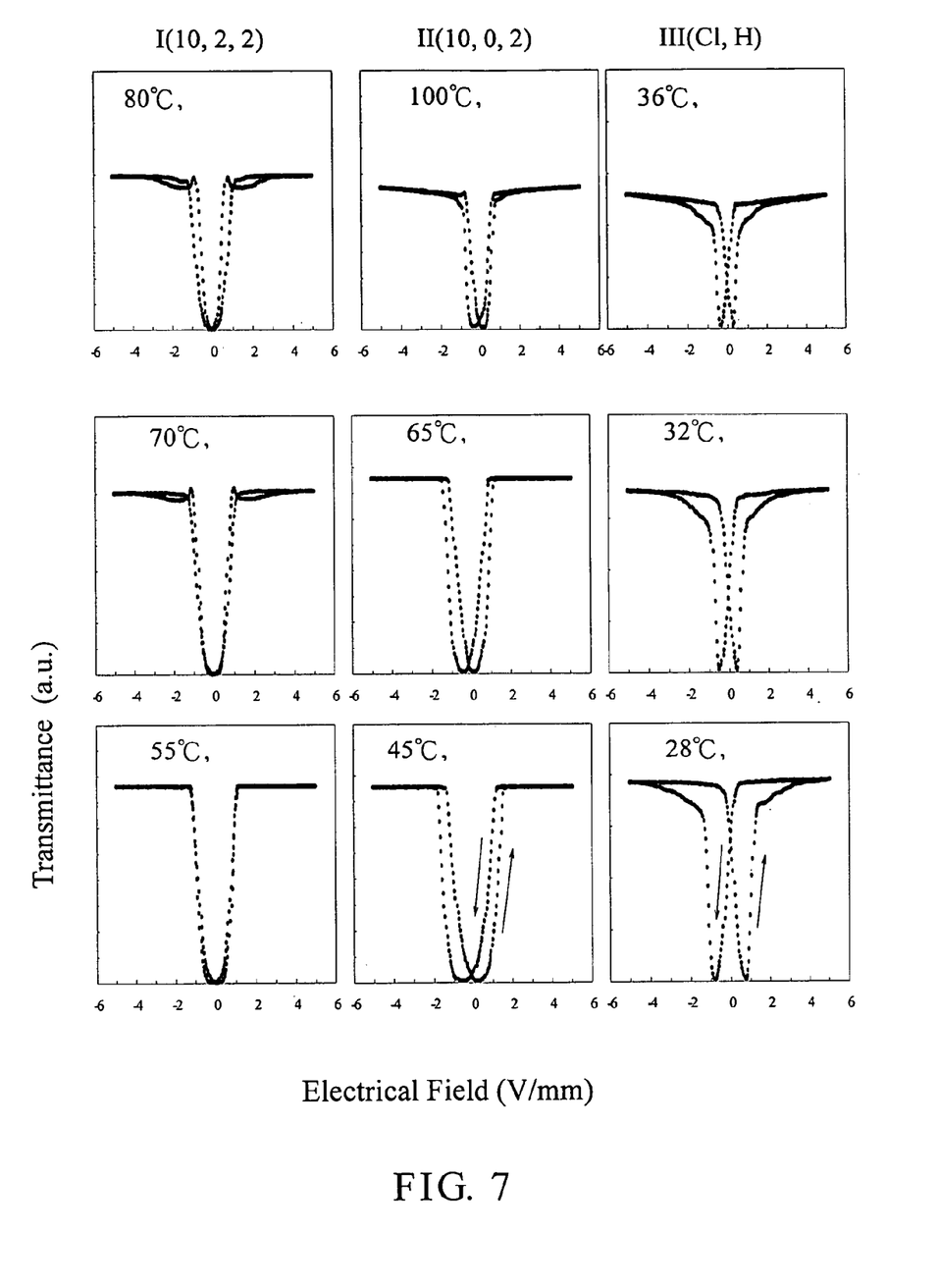
FIG. 7 is the diagram of transmitting response versus electric field of compound I (10, 2, 2), compound II (10, 0, 2) and compound III (Cl, H), after adding a triangle wave in a 5 m cell.

The electro-optical response data are determined by cross polarimeter wherein the optic axis of the polarimeter and analyzer are respectively parallel to and perpendicular to the smetic layer of liquid crystal cell. FIG. 7 is the diagram of transmitting response versus electric field for compound I (10, 2, 2), compound II (10, 0, 2) and compound III (Cl, H), after adding a triangle wave in a 5 m cell. The response is highly relevant to the temperature and the frequency. The highest transmittance increases as temperature decreases. The optical switching of compound II (10, 0, 2) at SmC* phase exhibits typical ferroelectric hysteresis loops when the applied frequency is 0.5 Hz. However, the chiral swallow-tailed compound, such as compound I (10, 2, 2), at SmC* phase exhibits U-type switching when the applied frequency is 0.5 Hz.

The following five preparation examples and two embodiments will further illustrate the skills of the present invention.

The products of the present invention are basically prepared from the following reaction scheme:

I (m,p,q; m = 8~12,p = 1 = 2, X = Y = H)
II (m,p,q; m = 10, p = 0,2,3,4,q = 2,3,4. X = Y = H)
III (X,Y;X = F, Cl, Y = F, Cl, m = 10, p = q = 2)

PREPARATION EXAMPLE 1

4-(4-alkyloxyphenyl)benzoic acid (Product 1)

25 mmol of 4-(4-Hydroxyphenyl)benzoic acid was mixed with 200 ml of ethanol and then added to a solution of 50 mmol of KOH, 3.6 mmol of KI and 50 ml of distilled water. The mixture was heated under reflux for 1 h. Then, 75 mmol of 1-bromoalkane was added drop wise to the mixture and heated continuously under reflux for 12 h. 100 ml of 10% KOH solution was subsequently added to said mixture and further heated under reflux for 2 h. After cooling to room temperature, 5% HCl was added and the mixture was filtered. Crude product was washed by water and re-crystallized in iced acetic acid and absolute alcohol to obtain Product 1 (yield: 60–70%).

PREPARATION EXAMPLE 2

4-Methoxycarbonyloxybenzoic acid (Product 2 (H, H))

NaOH solution (NaOH 175 mmol, $H_2O$ 200 ml) was kept at 0° C. and added to 65 mmol of 4-hydroxybenzoic acid with vigorous stirring. Then, 105 mmol of methyl chloroformate was added slowly to said solution at 0–5° C. Muddy mixture was further stirred for 4 h and concentrated HCl and water with ratio of 1:1 was added until the pH value reached 5. Plenty of precipitation was filtered and re-crystallized in ethanol to obtain white solid Product 2. The yield of Product 2 (H, H) is 85%.

$^1$H NMR (400 MHZ, $CDCl_3$); δ (ppm) 8.15 (s, 1H, —COO$\underline{H}$), 8.10–7.23(d, d, 4H, —Ar$\underline{H}$), 3.92(s, 3H, —OC$\underline{H}_3$).

PREPARATION EXAMPLE 3

1-Ethyloropyl (S)-2-hydroxvpronionate (Product 3 (2, 2))

130 mmol of (S)-2-Hydroxypropionic acid and 150 mmol of 3-propanol were dissolved in 30 ml of dry benzene and heated under reflux with Dean and Stark trap. Benzene was then evaporated under vacuum to get residues. The Product 3 (2, 2), 1-ethylpropyl (S)-hydroxypropionate, is limpid liquid (yield: 45%).

$^1$H NMR (400 MHZ, CDCl$_3$); δ(ppm) 0.84–0.76 (m, 6H, —(CH$_2$CH$_3$)$_2$), 1.36–1.31 (d 3H, —CHCH$_3$), 1.55–1.38(m, 4H, —CH(CH(CH2CH$_3$)$_2$), 3.84(s,1H —OH),4.21–4.15(m, 1H —COOCH—), 4.76–4.70(m, 1H, —COOCH(CH$_2$—)$_2$.

PREPARATION EXAMPLE 4

1-Ethylpropyl (S)-2-[4-(methoxycarbonyloxy)-phenoyloxy]pronionate (Product 4 (H,H,2.2))

13 mmol of diethyl azodicarboxylate (DEAD) and 13 mmol of Product 2 (H, H) were dissolved in 10 ml of dry THF and then added drop wise to a solution containing 13 mmol of triphenylphosphine (Ph$_3$P) and 10 mmol of Product 3 (2, 2) in 10 ml of dry Tetrahydrofolate(THF) at room temperature with vigorous stirring and initiated the reaction. Standing at room temperature overnight, the mixture was filtered to remove triphenylphosphine oxide, and THE was removed under vacuum. After checking every step, the product was purified by silica column chromatography and eluted with ethyl acetate/hexane (v/v=⅖) to obtain transparent liquid Product 4 (H, H, 2, 2) with yield of 75%.

$^1$H NMR (400 MHZ, CDCl$_3$); δ(ppm) 0.91–0.82 (m, 6H, —(CH$_2$CH$_3$)$_2$), 1.56–1.49(d, 3H, —CHCH$_3$), 1.62–1.58(m, 4H, —CH(CH$_2$CH$_3$)$_2$), 3.90(s, 3H, —COOCH$_3$), 4.84–4.80 (q, 1H —COOCH(CH$_2$)$_2$—), 5.30–5.27(m, 1H, —COOCHCH$_3$—,—ArH), 8.12–7.23 (d, d, 4H).

PREPARATION EXAMPLE 5

1-Ethylpropyl (S)-2-(4-hydroxyphenylcarbonyloxy)-propanoate (Product 5 (H,H,2,2))

3 mmol of Product 4 (H, H, 2, 2) was added to a mixture of 90 ml isopropanol and 30 ml of ammonium hydroxide (28%) with stirring at room temperature for 50 mins (complete reaction shown on TLC). The mixture was then poured into 40 ml of water and kept stirring. The product was extracted with dichloromethane (3×50 ml). The extract was washed with brine (3×50 ml), dried with MgSO$_4$, filtered and distilled to get transparent oil-like liquid. The oil-like liquid was purified by silica column chromatography and eluted with dichloromethane. Isolated product was dried under vacuum to get Product 5 (H, H, 2, 2) (yield: 80%).

$^1$H NMR (400 MHZ, CDCl$_3$): δ (ppm) 0.87–0.79 (m, 6H, —(CH$_2$CH$_3$)$_2$), 1.58–1.46(d, 3H, —CHCH$_3$), 1.76–1.58(m, 4H, —CH(CH$_2$CH$_3$)$_2$), 4.81–4.75 (m, 1H, —COOCH(CH$_2$)), 5.23–5.18 (q, 1H, —COOCHCH$_3$—), 6.27(s, 1H, —OH—), 7.85–6.73 (d, d, 4H, —ArH).

Embodiment 1

1-Ethylpropyl (S)-2-[4-(4'-alkyloxy-biphenylcarbonyloxy)phenylcarbonyloxy]propanoates: Series of Compound I (m,2,2; m=8–12)

Series of compound 1 has the structure as formula (i):

(I)

Mixture of 28.8 mmol of 4-(4'-alkyloxyphenyl)benzoic acid, 0.8 g (3.1 mmol) of Product 5, 2.8 mmol of N,N'-dicyclohexyl-carbodiimide, 0.28 mmol of 4-dimethylaminopyridine and 15 ml of dry THF was stirred at room temperature for 3 days. The mixture was then filtered to get precipitate which was then washed with 5% acetic acid solution (3×50 ml), 5% saturated sodium bicarbonate (3×50 ml) and water (3×50 ml). Residue was purified by silica column chromatography (70–230 mesh) and eluted with dichloromethane. The product was re-crystallized in absolute alcohol to obtain final product (yield: 40%).

For Compound I (10, 2, 2), $^1$H NMR (400 MHz, CDCl$_3$): δ (ppm) 1.81–0.84 (m, 32H, RCH$_2$CH$_3$), 4.01–3.98 (t, 2H, ArOCH$_2$), 4.86–4.80(m, 1H, —COOCH), 5.33–5.27 (q, 1H, —COOCHCH$_3$COO),8.22–6.98 (d, d, 12H, —ArH).

Embodiment 2

Series of Compound II (10, p, q) and Compound III (X, Y)

These two series of compounds were prepared according to the aforementioned methods.

Compound II has the structure as formula (II):

(II)

wherein n is 0 or 1 ; p is 0, 3, and 4: q is integral of 2~4.

Compound III has the structure as formula (III):

wherein n is 0 or 1 ;X and Y independently are fluorine or chlorine.

As disclosed in the above embodiments, the chiral liquid crystal materials of the present invention have broad range of operation temperature and high ferroelectricity. They can be further used as the precursor of liquid crystal stuffing in LCD.

Although the present invention has been explained in relation to its preferred embodiment, it is to be understood that many other possible modifications and variations can be made without departing from the spirit and scope of the invention as hereinafter claimed.

What is claimed is:

1. A chiral compound, comprising a structure of formula (I):

wherein m represents an integral from 6 to 18; and n represents 0.

2. A chiral compound, comprising a structure of formula (III):

wherein n represents 0; X is fluorine or chlorine; and Y is fluorine or chlorine.

* * * * *